H. B. SAUERMAN.
MATERIAL MOVING APPARATUS.
APPLICATION FILED DEC. 23, 1913.
1,118,585.
Patented Nov. 24, 1914.
5 SHEETS—SHEET 4.
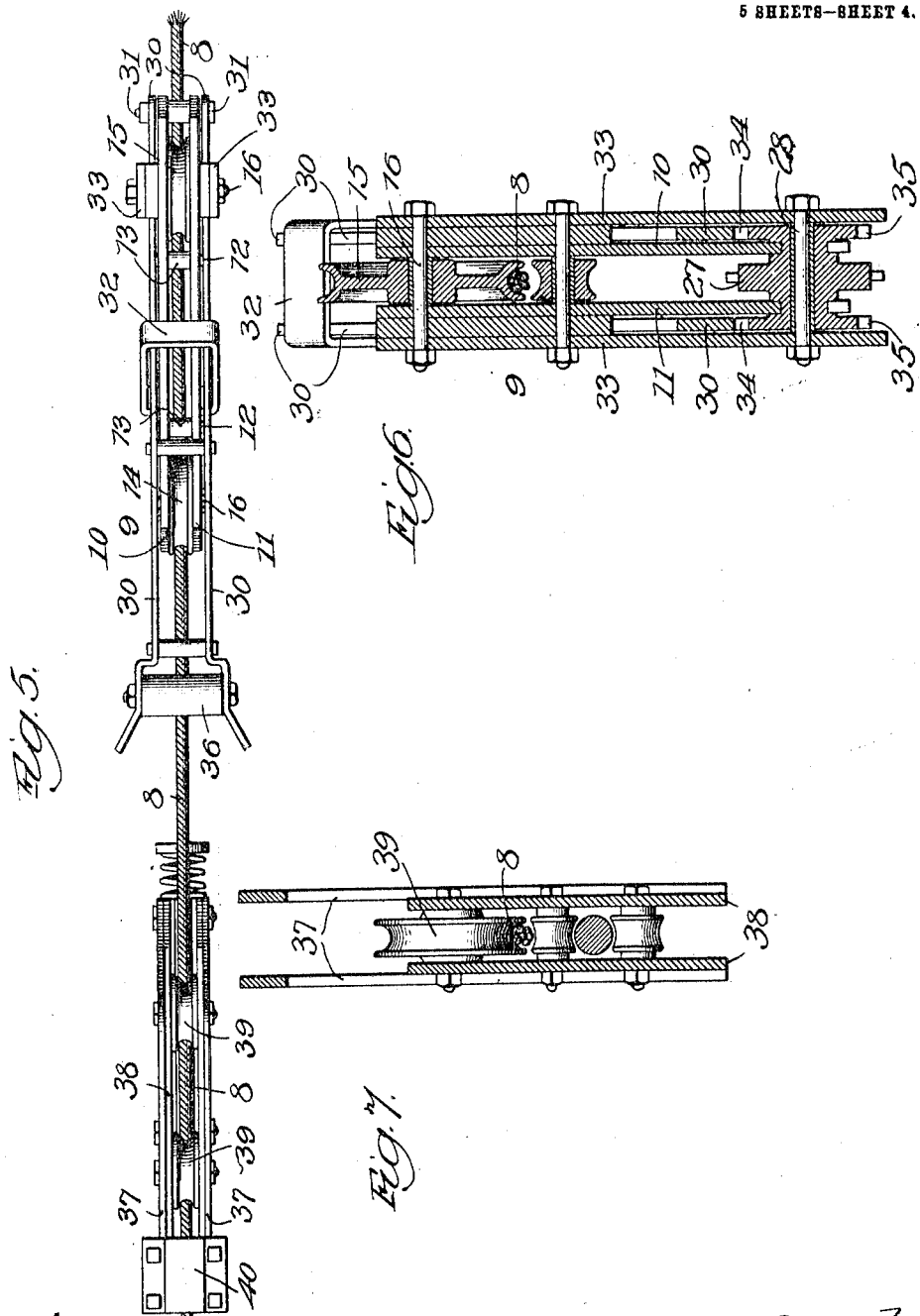

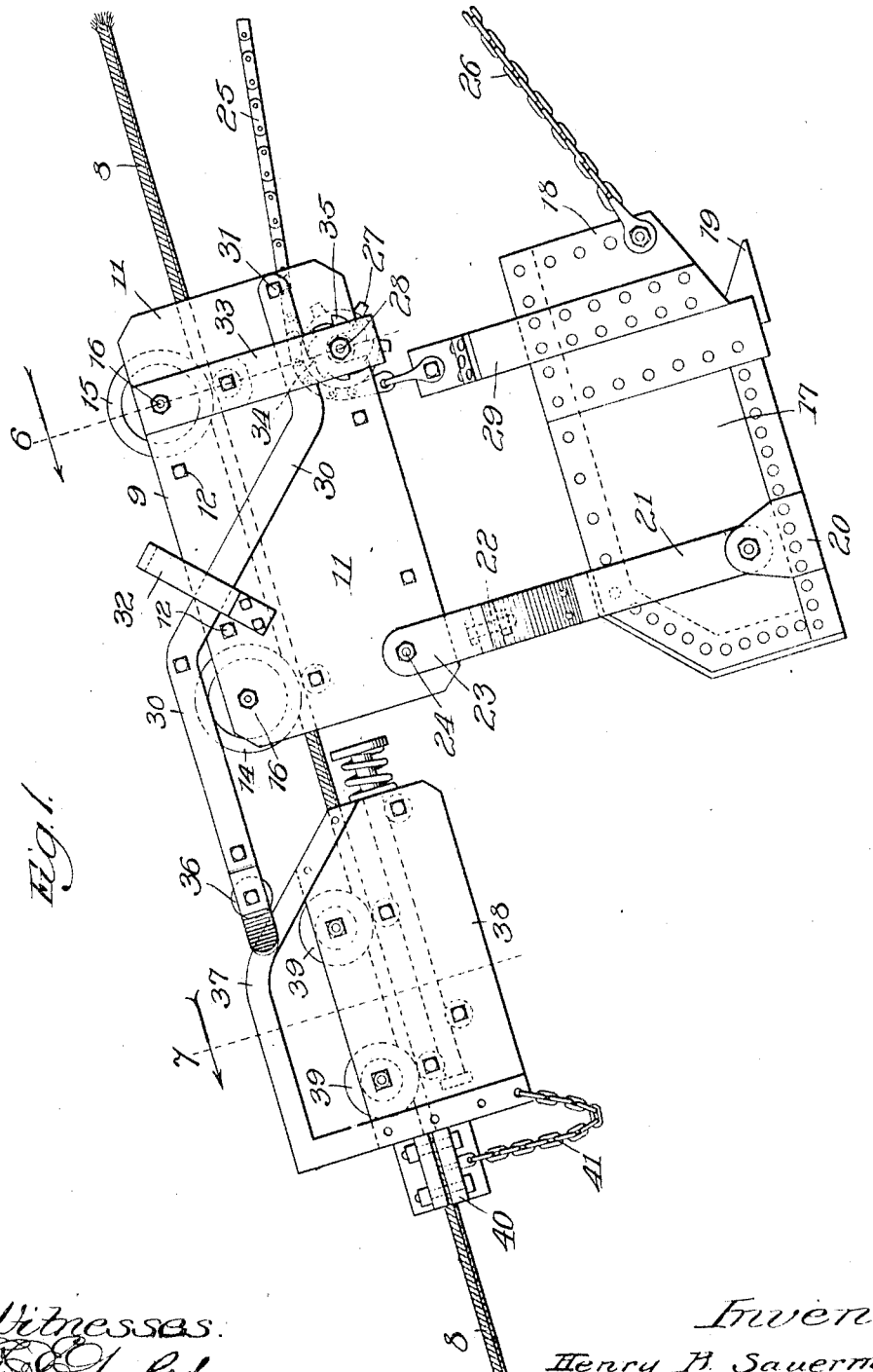

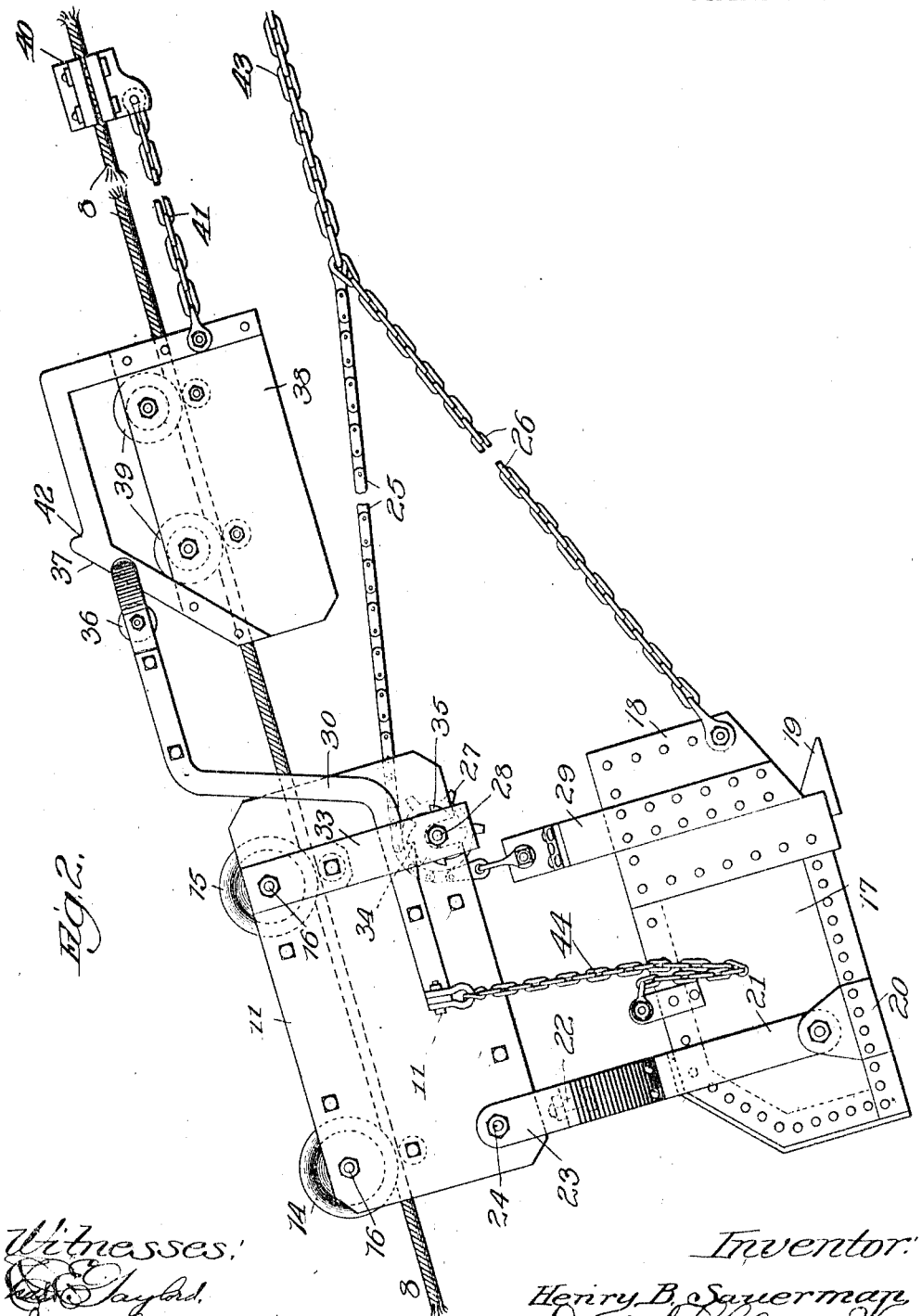

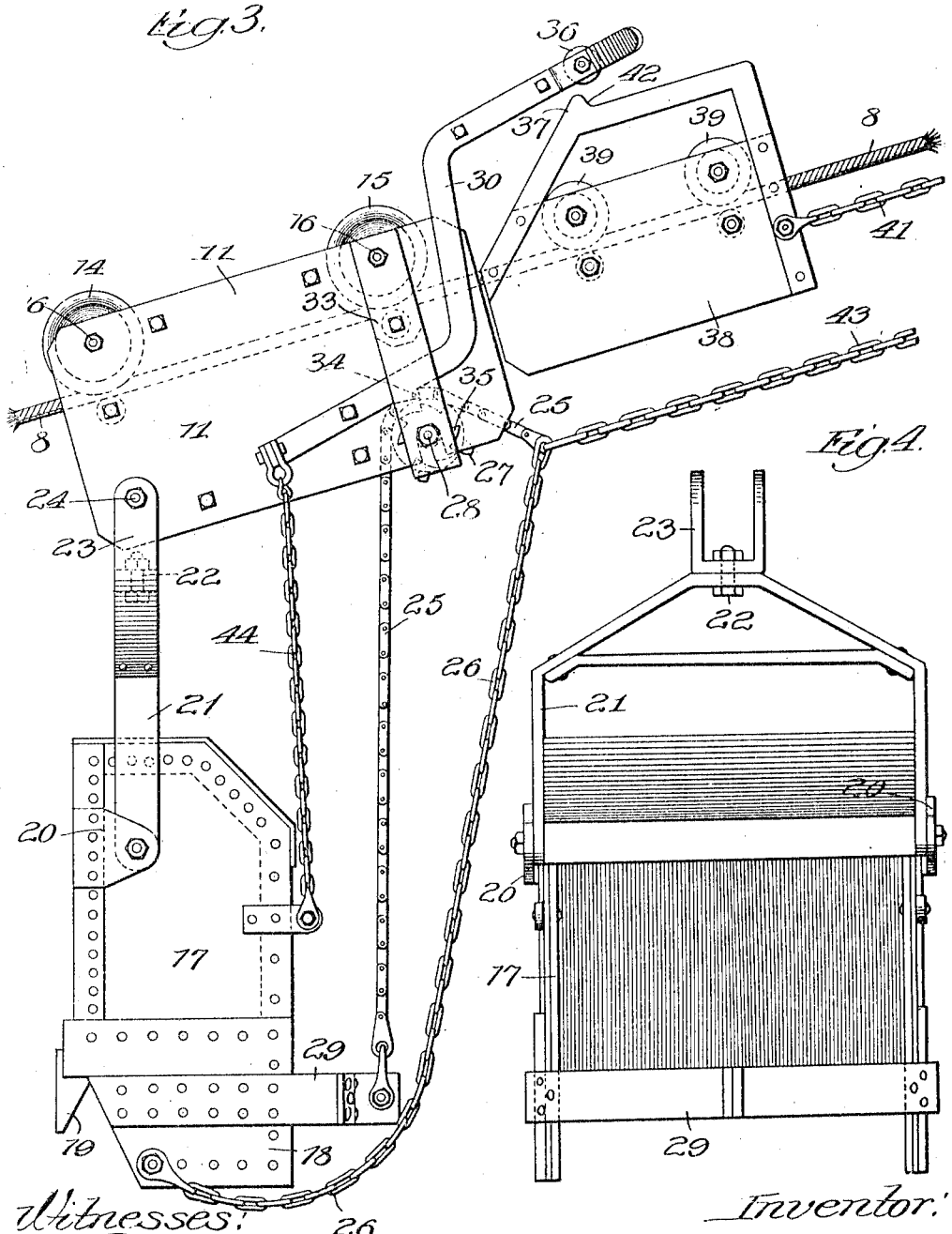

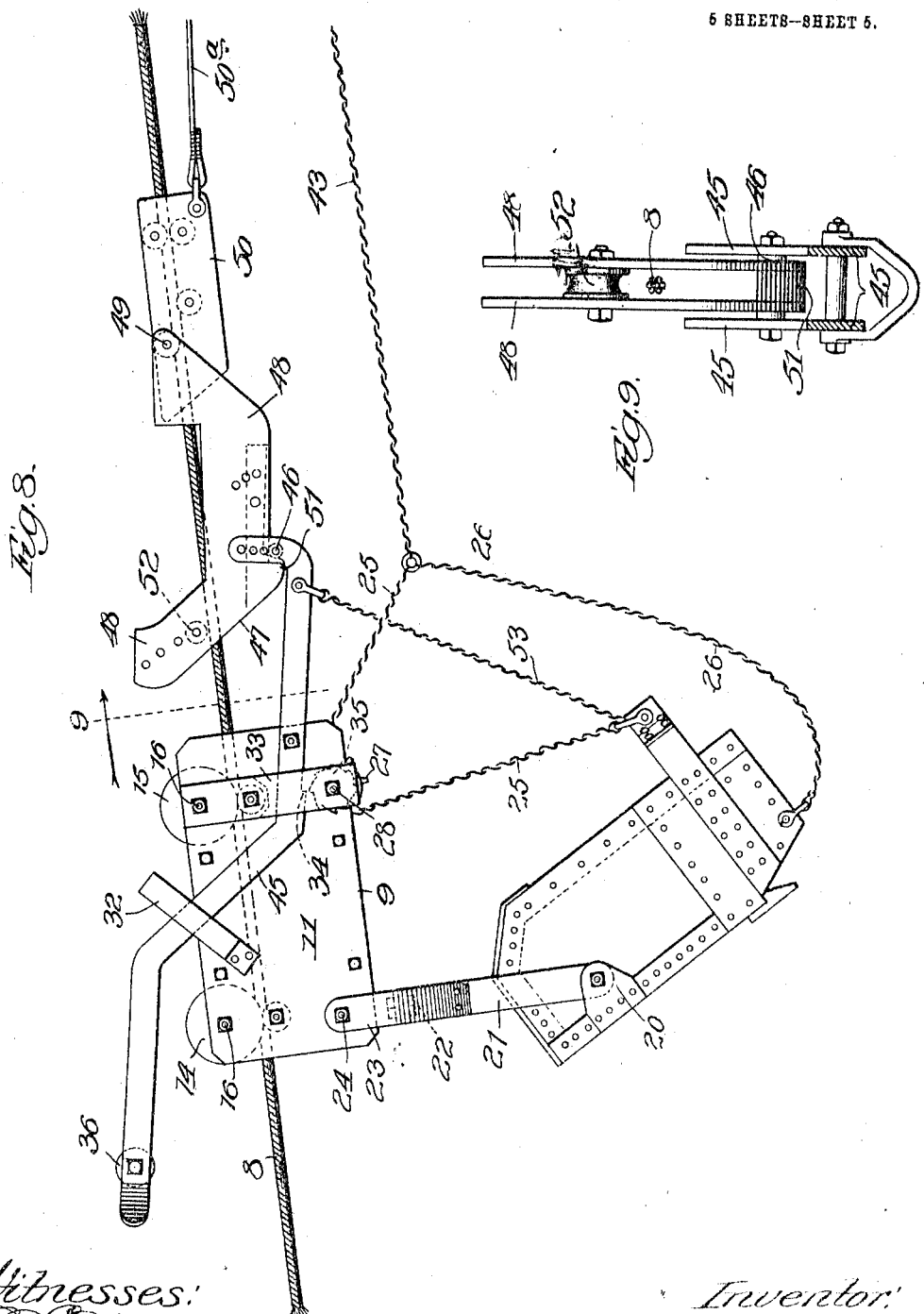

UNITED STATES PATENT OFFICE.

HENRY B. SAUERMAN, OF CHICAGO, ILLINOIS.

MATERIAL-MOVING APPARATUS.

1,118,585.

Specification of Letters Patent.

Patented Nov. 24, 1914.

Application filed December 23, 1913. Serial No. 808,407.

*To all whom it may concern:*

Be it known that I, HENRY B. SAUERMAN, a citizen of the United States, residing at Chicago, in the county of Cook and State of Illinois, have invented a new and useful Improvement in Material-Moving Apparatus, of which the following is a specification.

My invention relates to improvement in material-moving apparatus more particularly, though not exclusively, to apparatus of the type comprising, generally stated, an inclined cable-way supporting a traveling carriage thereon with a dumping scraper-bucket connected with the carriage, and a hauling line through the medium of which the movements of the carriage and bucket are controlled; and my objects are to so improve apparatus of this general character, as hitherto provided, as to render it better adapted for its purpose, be positive in operation and be proof against accidental dumping of the load.

Referring to the accompanying drawings Figure 1 is a view in side elevation of apparatus constructed in accordance with my invention for transferring material from a higher to a lower elevation, the apparatus being shown in the position it assumes immediately before dumping. Fig. 2 is a similar view of a modification showing a form of construction adapted for the transferring of material from a lower to a higher elevation, as for example in excavating work, the positions in which the parts of the apparatus are shown being those occupied by them immediately preceding the dumping operation. Fig. 3 is a similar view showing the parts in dumping position. Fig. 4 is a view in front elevation of the bucket in its dumped position represented in Fig. 3. Fig. 5 is a plan view of the apparatus of Fig. 1. Figs. 6 and 7, sections taken at the lines 6 and 7, respectively, on Fig. 1 and viewed in the direction of the arrows; Fig. 8 is a view like Fig. 3 of another modification of my invention showing the apparatus in dumping position; and Fig. 9, a section taken at the line 9 on Fig. 8 and viewed in the direction of the arrow.

Referring to the construction illustrated in Figs. 1, 5, 6 and 7, the inclined cable-way commonly used in apparatus of this general type is represented at 8, this cable in practice being anchored at its lower end in any suitable manner, and at its upper end supported at a higher elevation and in a manner adapting it to be slackened and made taut at will, all as is well understood in the art and therefore does not require illustration. Slidably mounted on the cable-way 8 is a carriage 9, which, in the form illustrated, is formed of a pair of plates 10 and 11 spaced apart and connected by bolts 12 carrying spacers 13 which serve to hold these plates in spaced relation to each other. Located between the plates 10 and 11 are pulleys 14 and 15 journaled on pins 16 and at which the carriage engages the cable-way 8. The dumping scraper or bucket represented at 17 and which is supported from the carriage 9, is of a form generally used, its forward open digging end 18 being provided with an edge-portion 19 in practice usually serrated. The bucket 17 is provided at opposite sides near its closed rear end with lugs 20 with which the lower ends of a yoke 21 are pivoted, this yoke being pivotally connected, as indicated at 22, with a strap member 23 pivotally supported, as indicated at 24, on the carriage 9. The bucket 17 is thus pivotally hung from the carriage 9 and at such a point relative to the center of gravity of the bucket that the latter will tend normally to swing to dumping position. The bucket 17 is connected at its front end with one of the branches 25 and 26 of the draft-cable which unite in a manner not shown in Fig. 1 (but clearly represented in Fig. 2), a slight distance beyond the bucket 17 and carriage 9, to form a single draft-cable as is often the practice in constructions of this character. The branch 25 of the draft-cable is preferably a chain which extends over a sprocket-wheel 27 journaled between the plates 10 and 11 of the carriage 9 on a pin 28, and connects at one end with a bail 29 on the forward end of the bucket 17 in advance of the center of gravity of the latter. By this arrangement when the draft-cable is pulled taut, it swings the bucket to the digging and carrying position (Fig. 1), but when the draft-cable is slackened, permits the bucket to dump by gravity.

In this construction provision is made for releasably holding the bucket 17 against dumping in its descent on the cable-way 8 to the point of discharge upon slackening the draft-cable, these means comprising a yoke 30 pivoted at 31 to the forward end of the carriage 9 at its opposite sides and located at one arm between the plate 10 and reinforcing members 32 and 33 secured to said plate and at its opposite arm between the plate 11 and members 32 and 33 secured to the plate 11 each of the arms of yoke 30 carrying a depending tooth 34 which normally engages with a ratchet 35 rigid with the sprocket 27, permitting the ratchets 35 to rotate clockwise in Fig. 1 when the draft-cable is pulled to taut condition, but preventing the reverse movement of these ratchets until the yoke 30 has been raised to a position in which the teeth 34 disengage from said ratchets. The rear end of the yoke 30 is provided with a roller 36 which is adapted to ride up on a cam-surface 37 provided on the upper side of a buffer member 38 preferably carried by pulleys 39 on the cable-way 8 and bearing against a head 40 rigidly connected with the latter, the members 38 and 40 being connected together by a chain 41 and the parts described being so arranged that when the yoke 30 rides at its roller 36 upon the cam-surface 37, it will disengage the teeth 34 from the ratchets 35 and thus permit the bucket 17 to swing by gravity to dumping position upon slackening the draft-cable. It will be understood that upon again drawing the draft-cable taut, after dumping the bucket, the latter will swing to filling and carrying position (Fig. 1) and be held against swinging to dumping position until the carriage is again allowed to travel downward on the cable-way 8 by slackening the draft-cable, to a position in which the yoke 30 will engage the cam-surface 37. Thus should the draft-cable be allowed to become sufficiently slack during the operation of filling the bucket or carrying the loaded bucket to dumping position, to permit the bucket under gravity to swing to dumping position if unrestrained, it will not operate to permit the bucket to dump as the teeth 34 on the yoke 30 will prevent the rotation of the sprocket 27. The chain 41 is provided for the purpose of preventing the member 38 from running down the cable in a direction away from the block 40 should the cable-way 8 in the operation of the excavating mechanism be inclined reversely to that shown in Fig. 1, it being desirable that the member 38 be free to maintain upright condition, as represented in Fig. 1, regardless of the twisting of the cable-way 8 which sometimes happens in practice.

In the construction illustrated in Figs. 2, 3 and 4, provision is made for transferring the load from a lower to a higher elevation. In this arrangement, the yoke 30 is reversed to cause its free end to extend in advance of the carriage and coöperate at its roller 36 with the cam-surface 37 on the block 38, which is connected by the chain 41 with the head 40 located at the point at which dumping is to take place. It being desirable that the carriage 9 be held against descending on the cable-way 8 until the bucket 17 has discharged its load, means are provided for holding the carriage against such movement, these means comprising a shoulder 42 on the member 38 into interlocking engagement with which the roller 36 moves in its engagement with the member 38. The engagement of the yoke 30 with the member 38 as described, swings the yoke 30 upwardly and causes the teeth 34 thereon to be lifted out of engagement with the ratchets 35, thus permitting the bucket 17 to swing to dumping position upon slackening the draft-cable, which latter is shown in these figures at 43 and has the branched sections 25 and 26 as explained of the construction of Fig. 1. Flexible means 44 connect the bucket 17 with the left-hand end of the yoke 30 (Fig. 2), the means 44 being of such length that it will cause the yoke 30 to be swung to the position represented in Fig. 3 when the bucket 17 swings to dumping position, thus lifting the roller 36 out of engagement with the shoulder 42 and permitting the carriage 9 to run down the cable 8 upon slackening the hauling line 43.

By the construction illustrated in Figs. 8 and 9, I have shown how the apparatus may be constructed to operate at either the upper or lower end portions of the cable-way as desired. This construction is the same as that shown in Fig. 1, excepting that the pawl-yoke, represented in this construction at 45, is extended forwardly to coöperate with means for releasing the pawls 34 and releasably holding the carriage 9 against retrograde movement when the bucket is to be dumped at the upper end of the cable 8. To this end the pawl-yoke 45 is equipped at its forward end with a cross-pin 46 which is adapted to ride against cam surfaces 47 provided on the underside of plates 48 located on opposite sides of the cable 8 and preferably pivoted at 49 to a head 50 which may slide on the cable 8, but which is held against downward movement thereon beyond a predetermined distance by a cable 50$^a$ connected with the head 50 and with the cable 8 in the manner described at the cable 41 in Fig. 2, the pin 46 being adapted to engage with notches 51 on the plates 48, as illustrated in Fig. 8, the member formed of these plates normally being supported by a roller 52 thereon on the cable 8.

It will be readily understood that the apparatus just described may operate, if desired, to dump the bucket at the lower end of the cable 8 as described of the construction illustrated in Fig. 1, or, if desired, it may be operated to dump the bucket at the upper end of the cable 8 as follows: The weight of the rearwardly extending portion of the yoke 45 being greater than its forward end, the pawls 34 will normally bear against the ratchets 35 and prevent anti-clockwise rotation of these ratchets for the purpose hereinbefore stated. The yoke 45, in engaging at its pin 46 with the cam surfaces 47 in the movement of the carriage 9 up the cable 8, is rocked downwardly at its forward end thus disengaging the pawls 34 from the ratchets 35 and finally interlocking at its pin 46 with the notches 51. The operator thereupon slackens the hauling line 43 which permits the bucket to dump (the bucket being shown in a position it assumes while moving to dumping position). In the final movement of the bucket to dumping position it pulls on a cable 53 attached to the bucket and the forward end of the yoke 45, and disengages the pin 46 from the notches 51, thus freeing the carriage 9 and permitting it to run down the cable 8, the yoke 45 thus freed swinging down at its rear end to engage the pawls 34 with the ratchets 35 for the purpose hereinbefore explained.

While I have illustrated and described certain forms in which my invention may be provided, I do not wish to be limited thereto as the same may be variously modified and altered without departing from the spirit of my invention, it being my intention and desire to claim my invention as fully and completely as the prior state of the art will permit.

What I claim as new and desire to secure by Letters Patent is—

1. In material-moving apparatus, the combination of a support, a dumping bucket connected with said support to swing thereon by gravity, when loaded, to dumping position, a hauling line connected with said bucket, a rotary member on said support over which said hauling line extends, and releasable means operatively engaging said rotary member for holding the latter against rotation in one direction and thereby prevent the bucket from swinging to dumping position in the event the hauling line becomes slack.

2. In material-moving apparatus, the combination of a support, a dumping bucket connected with said support to swing thereon by gravity, when loaded, to dumping position, a hauling line connected with said bucket, a rotary member on said support over which said hauling line extends, releasable means operatively engaging said rotary member for holding the latter against rotation in one direction and thereby prevent the bucket from swinging to dumping position in the event the hauling line becomes slack, and means for releasing said first-named means.

3. In material-moving apparatus, the combination of a support, a dumping bucket connected with said support to swing thereon by gravity, when loaded, to dumping position, a hauling line connected with said bucket, a rotary member on said support over which said hauling line extends, releasable means operatively engaging said rotary member for holding the latter against rotation in one direction and thereby prevent the bucket from swinging to dumping position in the event the hauling line becomes slack, and automatically operating means for releasing said first-named means.

4. In material-moving apparatus, the combination of a support, a dumping bucket connected with said support to swing thereon by gravity, when loaded, to dumping position, a hauling line formed with a branched section, said branches connected with said bucket, a rotary member on said support over which one of said branches extends, and releasable means operatively engaging said rotary member for holding the latter against rotation in one direction and thereby prevent the bucket from swinging to dumping position in the event the hauling line becomes slack.

5. In material-moving apparatus, the combination of a support, a dumping bucket connected with said support to swing thereon by gravity, when loaded, to dumping position, a hauling line formed with a branched section, said branches connected with said bucket, a rotary member on said support over which one of said branches extends, releasable means operatively engaging said rotary member for holding the latter against rotation in one direction and thereby prevent the bucket from swinging to dumping position in the event the hauling line becomes slack, and automatically operating means for releasing said last-named means.

6. In material-moving apparatus, the combination of a support, a dumping bucket connected with said support to swing thereon by gravity, when loaded, to dumping position, a hauling line having a section connected with said bucket, a rotary member on said support over which said hauling line extends, a ratchet connected with said rotary member, and a pawl engaging said ratchet.

7. In material-moving apparatus, the combination of a support, a dumping bucket connected with said support to swing thereon by gravity, when loaded, to dumping position, a hauling line connected with said bucket, a rotary member on said support over which said hauling line extends, releasable means for holding said member against rotation in one direction, and means for automatically releasing said last-named means.

8. In material-moving apparatus, the combination of a support, a dumping bucket connected with said support to swing thereon by gravity, when loaded, to dumping position, a hauling line connected with the bucket, a rotary member on said support over which said hauling line extends, a ratchet connected with said rotary member, a pawl engaging said ratchet, and means for automatically disengaging said pawl from the ratchet.

9. In material-moving apparatus, the combination of a support, a dumping bucket connected with said support to swing thereon by gravity, when loaded, to dumping position, a hauling line connected with said bucket, a rotary member on said support over which said hauling line extends, a ratchet connected with said rotary member, a pawl operating under gravity to engage said ratchet, and means for automatically disengaging said pawl from said ratchet.

10. In material-moving apparatus, the combination of a support, a dumping bucket connected with said support to swing thereon by gravity, when loaded, to dumping position, a hauling line connected with said bucket, a rotary member on said support over which said hauling line extends, a ratchet connected with said rotary member, a pawl adapted normally to engage said ratchet, and means located at the point of dumping operating automatically to release said pawl from the ratchet.

11. In apparatus of the character set forth, the combination of a cable-way, a carriage movably supported thereon, a dumping bucket pivotally connected with said carriage and movable on said carriage by gravity, when loaded, to dumping position, a hauling line connected with said bucket, a rotary member on said carriage over which said hauling line extends, and releasable means operatively engaging said rotary member for holding the latter against rotation in one direction and thereby prevent the bucket from swinging to dumping position in the event the hauling line becomes slack.

12. In apparatus of the character set forth, the combination of a cable-way, a carriage movably supported thereon, a dumping bucket pivotally connected with said carriage and movable on said carriage by gravity, when loaded, to dumping position, a hauling line connected with said bucket, a rotary member on said carriage over which said hauling line extends, releasable means operatively engaging said rotary member for holding the latter against rotation in one direction and thereby prevent the bucket from swinging to dumping position in the event the hauling line becomes slack, and means operating automatically to release said first-named means.

13. In apparatus of the character set forth, the combination of a cable-way, a carriage movably supported thereon, a dumping-bucket pivotally connected with said carriage and movable on said carriage by gravity, when loaded, to dumping position, a hauling line having a chain section connected with said bucket, a sprocket journaled on said carriage and with which said chain-section engages, and releasable means for holding said sprocket against rotation in one direction, for the purpose set forth.

14. In apparatus of the character set forth, the combination of a cable-way, a carriage movably supported thereon, a dumping-bucket pivotally connected with said carriage and movable on said carriage by gravity, when loaded, to dumping position, a hauling line having a chain section connected with said bucket, a sprocket journaled on said carriage and with which said chain-section engages, a ratchet connected with said sprocket, and a pawl engaging said ratchet.

15. In apparatus of the character set forth, the combination of a cable-way, a carriage movably supported thereon a dumping-bucket pivotally connected with said carriage and movable on said carriage by gravity, when loaded, to dumping position, a hauling line having a chain section connected with said bucket, a sprocket journaled on said carriage and with which said chain-section engages, releasable means for holding said sprocket against rotation in one direction, and means for automatically releasing said last-named means.

16. In apparatus of the character set forth, the combination of a cable-way, a carriage movably supported thereon, a dumping-bucket pivotally connected with said carriage and movable on said carriage by gravity, when loaded, to dumping position, a hauling line having a chain section connected with said bucket, a sprocket journaled on said carriage and with which said chain-section engages, a ratchet connected with said sprocket, a pawl engaging said ratchet, and means for automatically disengaging said pawl from the ratchet.

17. In apparatus of the character set forth, the combination of a cable-way, a carriage movably supported thereon, a dumping-bucket pivotally connected with said carriage and movable on said carriage by gravity, when loaded, to dumping position, a hauling line having a chain section connected with said bucket, a sprocket journaled on said carriage and with which said chain-section engages, a ratchet connected with said sprocket, a pawl operating under gravity to engage said ratchet, and means for automatically disengaging said pawl from said ratchet.

18. In apparatus of the character set forth, the combination of a cable-way, a carriage movably supported thereon, a dumping-bucket pivotally connected with said carriage and movable on said carriage by gravity, when loaded, to dumping position, a hauling line having a chain section conhected with said bucket, a sprocket journaled on said carriage and with which said chain-section engages, a ratchet connected with said sprocket, a pawl adapted normally to engage said ratchet, and means on said cable located at the point of dumping operating automatically to release said pawl from the ratchet.

19. In apparatus of the character set forth, the combination of a cable-way, a carriage movably supported thereon, a dumping-bucket pivotally connected with said carriage and movable on said carriage by gravity, when loaded, to dumping position, a hauling line connected with said bucket, releasable means on said carriage engaging the hauling line for preventing the bucket from swinging to dumping position in the event the hauling line becomes slack, a stop for limiting the movement of the carriage on said cable-way, and means on said stop for releasing said releasable means.

20. In apparatus of the character set forth, the combination of a cable-way, a carriage movably supported thereon, a dumping-bucket pivotally connected with said carriage, and movable on said carriage by gravity, when loaded, to dumping position, a hauling line connected with said bucket, releasable means on said carriage engaging the hauling line for preventing the bucket from swinging to dumping position, in the event the hauling line becomes slack and including a lever pivoted on said carriage, a stop for limiting the movement of the carriage on said cable-way, and cam-means on said stop for actuating said lever.

21. In apparatus of the character set forth, the combination of an inclined cable-way, a carriage movably supported thereon, a dumping-bucket pivotally connected with said carriage and movable on said carriage by gravity, when loaded, to dumping position, a hauling line connected with said bucket, releasable means on said carriage engaging the hauling line for preventing the bucket from swinging to dumping position in the event the hauling line becomes slack, a stop located adjacent to the lower end of the cable-way forming an abutment for the carriage, and means on said stop for releasing said releasable means.

22. In material-moving apparatus, the combination of a support, a dumping-bucket connected with said support to swing thereon by gravity, when loaded, to dumping position, a hauling-line connected with said bucket, releasable means on said support engaging the hauling-line for preventing the bucket from swinging to dumping position when the line is slackened, and means for releasing said means.

23. In material-moving apparatus, the combination of a support, a dumping-bucket connected with said support to swing thereon by gravity, when loaded, to dumping position, a hauling-line connected with said bucket, and releasable means on said support engaging the hauling-line and constructed and arranged to permit the line to be drawn to a position for moving the bucket to load-carrying position but holding the line for preventing the bucket from swinging to dumping position when said line is slackened.

HENRY B. SAUERMAN.

In presence of—
O. C. AVISUS,
A. J. FLOYD.